UNITED STATES PATENT OFFICE.

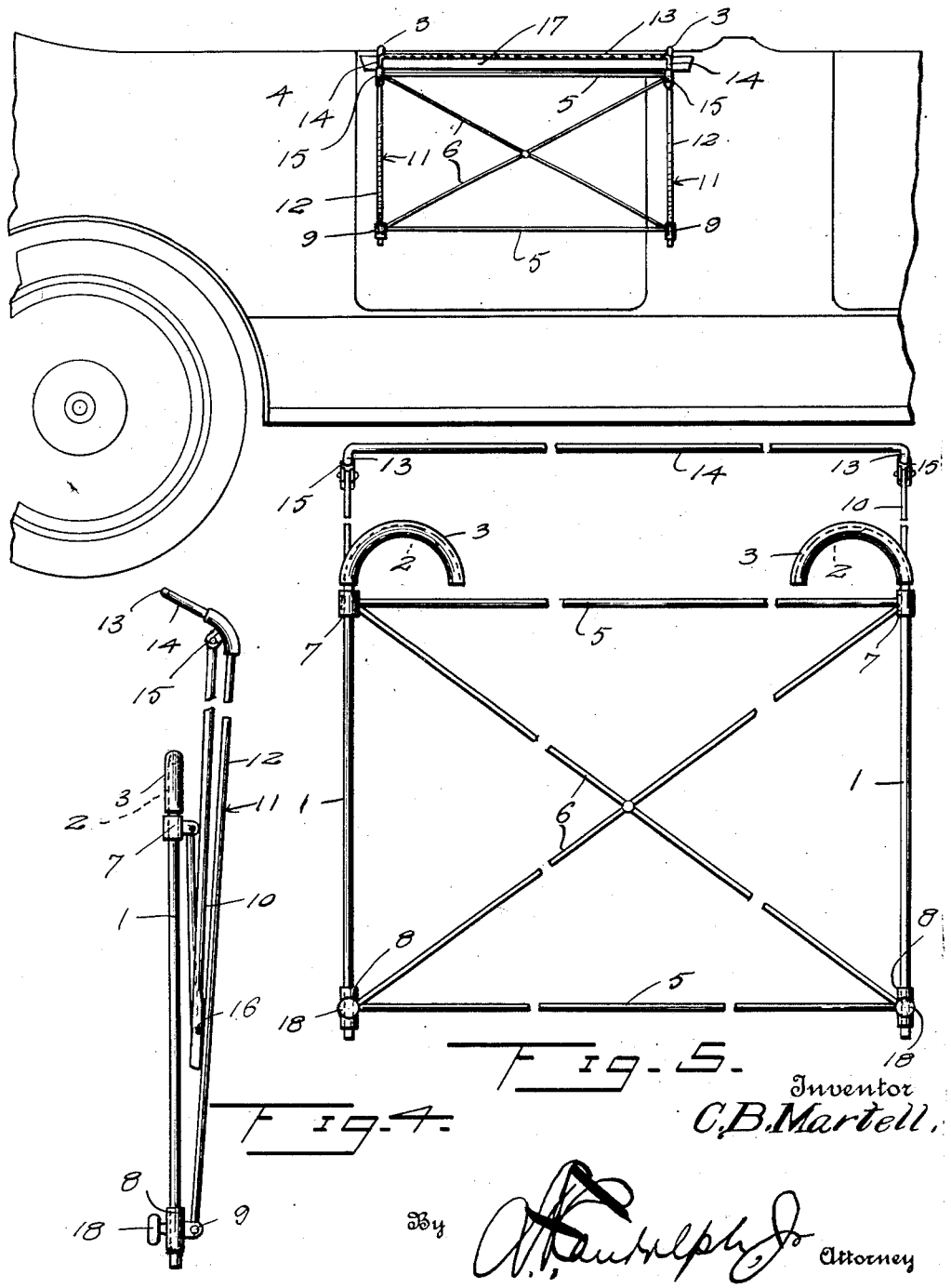

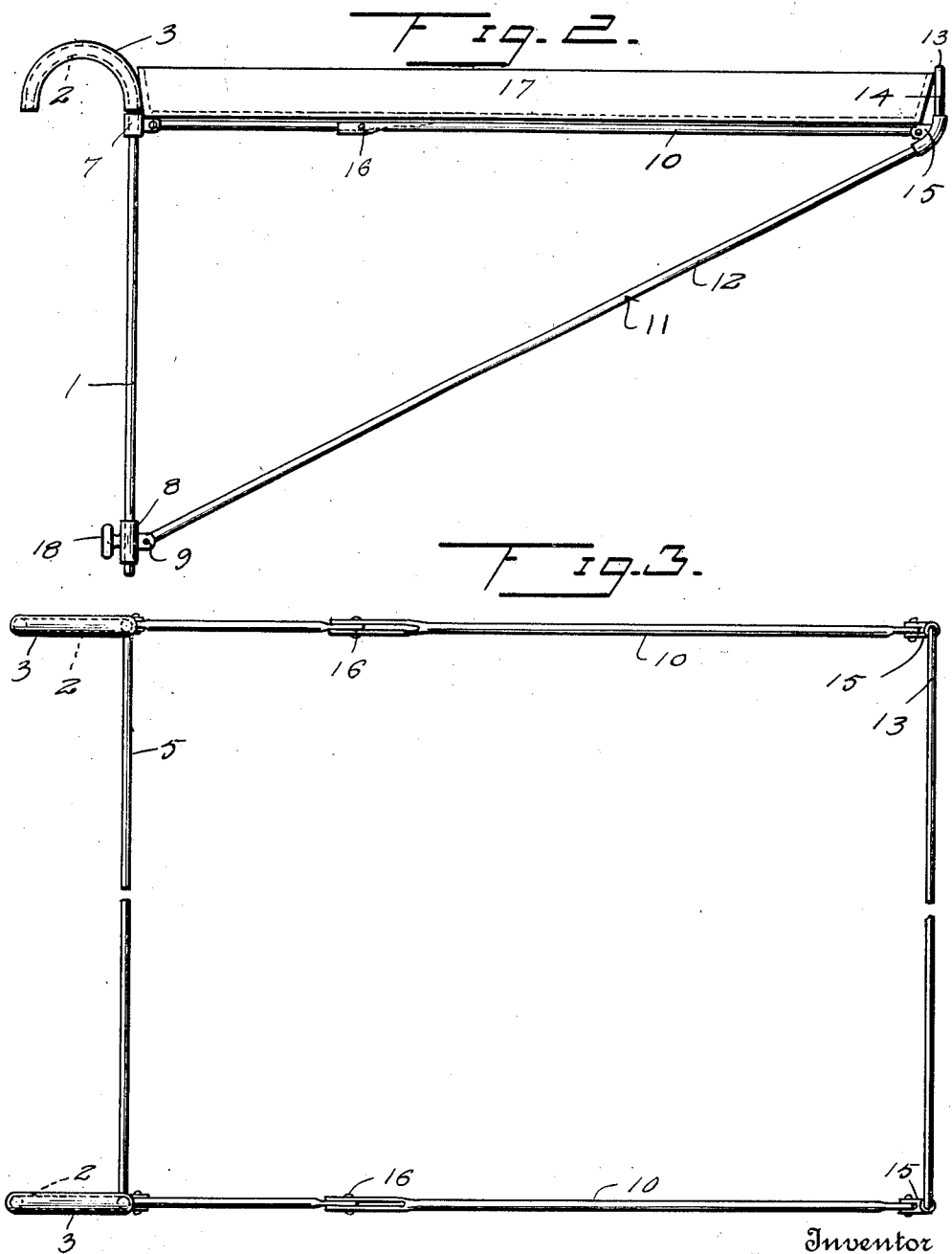

CHARLES B. MARTELL, OF NEW ORLEANS, LOUISIANA.

PORTABLE RACK OR FRAME.

1,383,324.	Specification of Letters Patent.	Patented July 5, 1921.

Application filed September 16, 1920. Serial No. 410,676.

*To all whom it may concern:*

Be it known that I, CHARLES B. MARTELL, a citizen of the United States, residing at New Orleans, in the parish of Orleans and State of Louisiana, have invented certain new and useful Improvements in Portable Racks or Frames; and I do hereby declare the following to be a full, clear, and exact description of the invention, such as will enable others skilled in the art to which it appertains to make and use the same.

This invention relates to new and useful improvements in portable racks or frames especially adapted for supporting a tray containing refreshments on the side of an automobile or other vehicle, thereby providing a device extremely useful for the purpose of proprietors of refreshment establishments that serve the occupants of an automobile while seated therein and also provides a device which is extremely advantageous to persons when picnicking or touring as lunches or light meals may be conveniently supported and eaten from the device.

Another object of this invention is the provision of a rack or frame which may be easily and quickly applied and removed from an automobile and which will support a tray containing refreshments without the liability of spilling the refreshments and which may be readily folded into a compact article when not desiring to use the same.

A further object of this invention is the provision of a portable rack or frame of the above stated character which will be simple, durable, and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a view illustrating a portable rack or frame applied to the side of an automobile, Fig. 2 is an end elevation illustrating the frame or rack, Fig. 3 is a top plan view illustrating the same, Fig. 4 is an end view illustrating the rack or frame in a folded position, Fig. 5 is a front elevation illustrating the rack or frame in a folded position.

Referring in detail to the drawings, the numeral 1 indicates vertical uprights constructed from heavy gage wire or comparatively small rods and said uprights have their upper ends bent to form hooks 2 covered with packing 3 to prevent said hooks from scratching or marring the side of an automobile 4 when applied thereto. The uprights 1 are connected together adjacent their upper and lower ends by longitudinally extending braces 5 and also by diagonally extending braces 6. The braces 5 and 6 may be constructed of heavy gage wire or extremely small rods so as to render the device comparatively light in weight and thereby permit a person to readily carry the same from one place to another and also to easily apply and remove it from the side of the automobile. Upper and lower sleeves 7 and 8 are mounted on the uprights 1 and frictionally engage the same and have formed thereon ears 9 to which supporting arms 10 and a frame 11 are pivoted. The frame 11 consists of upwardly and outwardly extending side members 12 connected by an integral tray retaining member 13. The outer ends of the side members 12 adjacent their formation to the tray retaining member 13 are bent vertically as illustrated at 14 and have secured thereto ears 15 to which the arms 10 are pivoted so that said arms are disposed in a plane slightly below the tray retaining member 13. The arms 10 each include a pair of sections connected together by a hinge or joint 16 which will permit folding of the arms and also folding of the frame 11 against the uprights 1 and braces 5 and 6 when carrying the device or when desiring to store the device in a comparatively small space. The sleeves 7 and 8 having frictional contact with the uprights will permit of the uprights being turned in said sleeves when manual force is exerted thereon so that the hooks may be positioned to extend parallel with the braces 5, thereby further reducing the size of the device when folded or in a collapsed position.

A tray 17 may be positioned on the arms 10 and prevented from sliding off of said arms by the hooks 2 and the tray retaining member 13 and said tray is adapted to support refreshments either when the device is being transported or when applied to the side of an automobile. When the device is applied to the side of an automobile, the hooks 2 engage over the upper edge of a door or any other convenient point on the automobile, and the padding 3 prevents scratching or marring of the automobile. The padding 3 may be in the form of tubular elements constructed from rubber or any other material suitable for the purpose placed over the hooks. The sleeves 8 have secured thereon rubber bumpers or feet 18 adapted to engage the side of the automobile to coöperate with the hooks in supporting the tray and also will prevent the uprights from coming in contact with the sides of the automobile and thereby eliminate any danger of said uprights scratching or marring the automobile.

While I have shown and described the preferred embodiment of my invention, it will be understood that minor changes in construction, combination, and arrangement of parts may be made without departing from the spirit and scope of the invention as claimed.

Having thus described the invention what is claimed is:—

1. A portable rack comprising vertical uprights, hooks for detachably securing the uprights to the side of an automobile, sleeves mounted on said uprights and having frictional engagement therewith, longitudinally and diagonally extending braces connecting the uprights together, a tray supporting and retaining member pivoted to the sleeves on the lower ends of the uprights, and folding arms pivoted to the sleeves on the upper ends of the uprights and to the tray supporting member.

2. A portable rack comprising vertical uprights, means connecting said uprights together, hooks formed on said uprights for engagement with an automobile, sleeves mounted on said uprights and having frictional contact therewith, buffers carried by some of said sleeves for engagement with the side of the automobile, a tray retaining member including upwardly and outwardly inclined members pivoted to the sleeves at the lower ends of the uprights and connected by a longitudinally extending member, said side members being bent vertically adjacent their formation to the longitudinally extending member, sleeves mounted on said side members at their bent portions, sectional arms pivoted to the sleeves on the upper ends of the uprights and to the sleeves on the side members, and joints connecting the sections of the arms and capable of permitting said arms to be folded, said arms adapted to support a tray and the latter to be retained thereon by the hooks and the longitudinally extending member.

3. A portable rack comprising uprights having their upper ends bent to form attaching hooks, sleeves journaled on said uprights, means connecting said sleeves, a tray supporting member pivoted to the lower sleeves and extending upwardly and outwardly therefrom, and folding tray supporting arms pivoted to the upper sleeves and to the upper end of said frame and adapted to permit the frame to be folded in the direction of the uprights.

4. A portable rack comprising uprights having their upper ends bent to form attaching hooks, sleeves journaled on said uprights adjacent the upper and lower ends thereof, diagonal and horizontal braces connecting said sleeves, a tray supporting member pivoted to the lower sleeves and extending upwardly and outwardly therefrom, and folding tray supporting arms pivoted to the upper sleeves and to the upper end of said frame and adapted to permit the frame to be folded in the direction of the uprights.

5. A portable rack comprising uprights having their upper ends bent to form attaching hooks, upper and lower sleeves journaled on said uprights, means connecting said sleeves, a substantially U-shaped frame having the ends of its arm portions pivoted to the lower sleeve, said arm portions extending upwardly and outwardly from the uprights and bent to dispose the bight portion of said frame in a plane with the uprights, sleeves secured on the bend of said arm portions, and folding tray supporting arms pivoted to the last named sleeves and to the upper sleeve.

In testimony whereof I affix my signature in presence of two witnesses.

CHARLES B. MARTELL.

Witnesses:
ANTOINETTE D. HORNUFF,
AURORA D. EDGAR.